April 10, 1951  G. T. McCLURE ET AL  2,548,674
BRAKE CONTROL APPARATUS
Filed Dec. 30, 1948  3 Sheets-Sheet 1

INVENTORS
Erik G. Erson
Glenn T. McClure
BY Adelbert A. Steinmiller
ATTORNEY

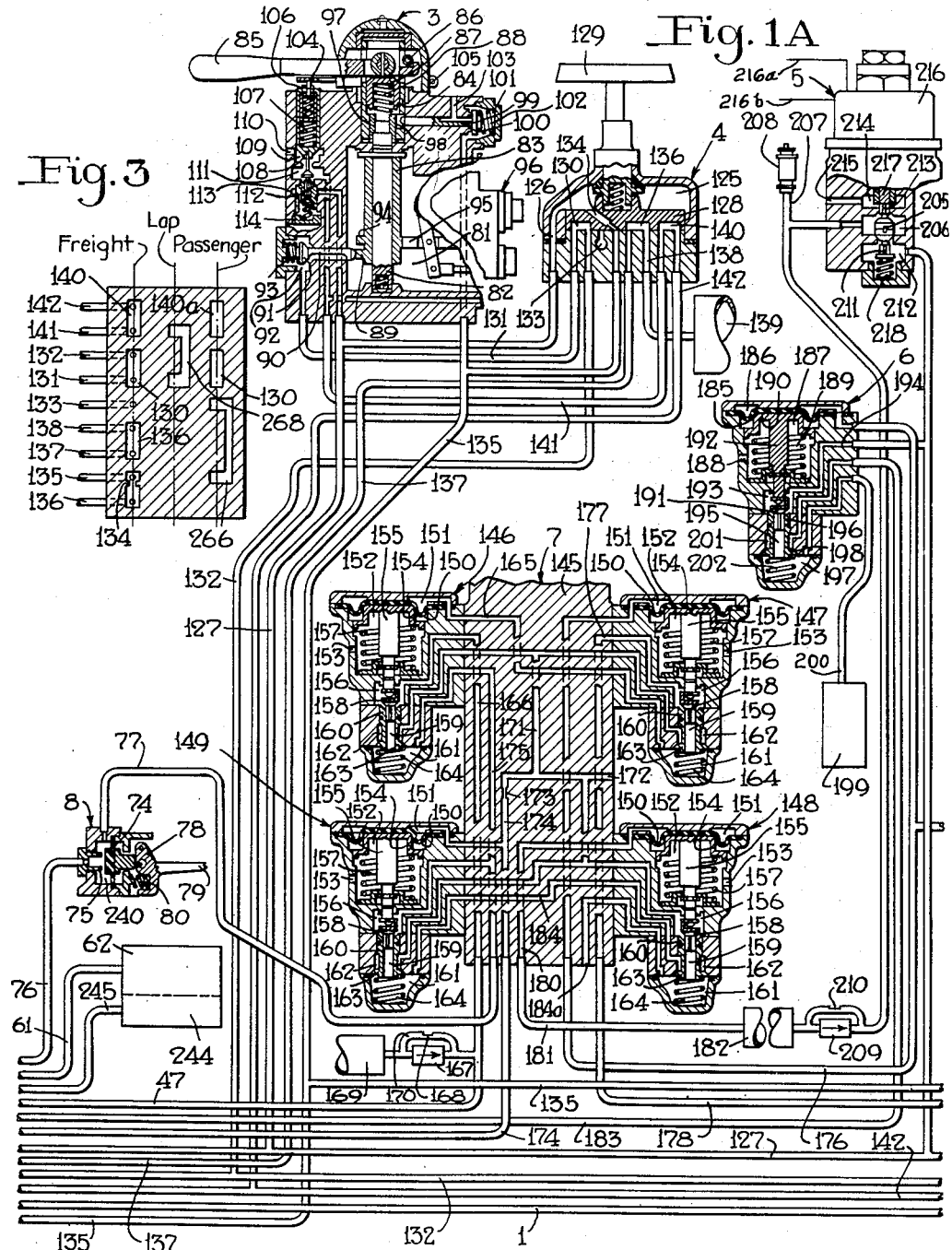

April 10, 1951 G. T. McCLURE ET AL 2,548,674
BRAKE CONTROL APPARATUS
Filed Dec. 30, 1948 3 Sheets-Sheet 3

INVENTORS
Erik G. Erson
Glenn T. McClure
BY
Adelbert A. Steinmiller
ATTORNEY

Patented Apr. 10, 1951

2,548,674

UNITED STATES PATENT OFFICE 2,548,674

BRAKE CONTROL APPARATUS

Glenn T. McClure, McKeesport, and Erik G. Erson, Wilkinsburg, Pa., assignors to The Westinghouse Air Brake Company, Wilmerding, Pa., a corporation of Pennsylvania Application December 30, 1948, Serial No. 68,336

32 Claims. (Cl. 303—18)

This invention relates to fluid pressure brake equipment for railroad locomotives, and more particularly to the type embodying automatic train speed control equipment and automatic safety control equipment.

The principal object of the invention is to provide an improved brake equipment of the above type.

Another object of this invention is to provide an equipment of the above type which is readily adaptable to provide any one or all of the features of automatic train speed control equipment or automatic safety control equipment without disturbing the piping connections or greatly modifying the equipment.

Another object is to provide a single basic brake equipment which may be readily applied to any type of locomotive.

Other objects and advantages will be apparent from the following more detailed description of the invention.

Figure 1:
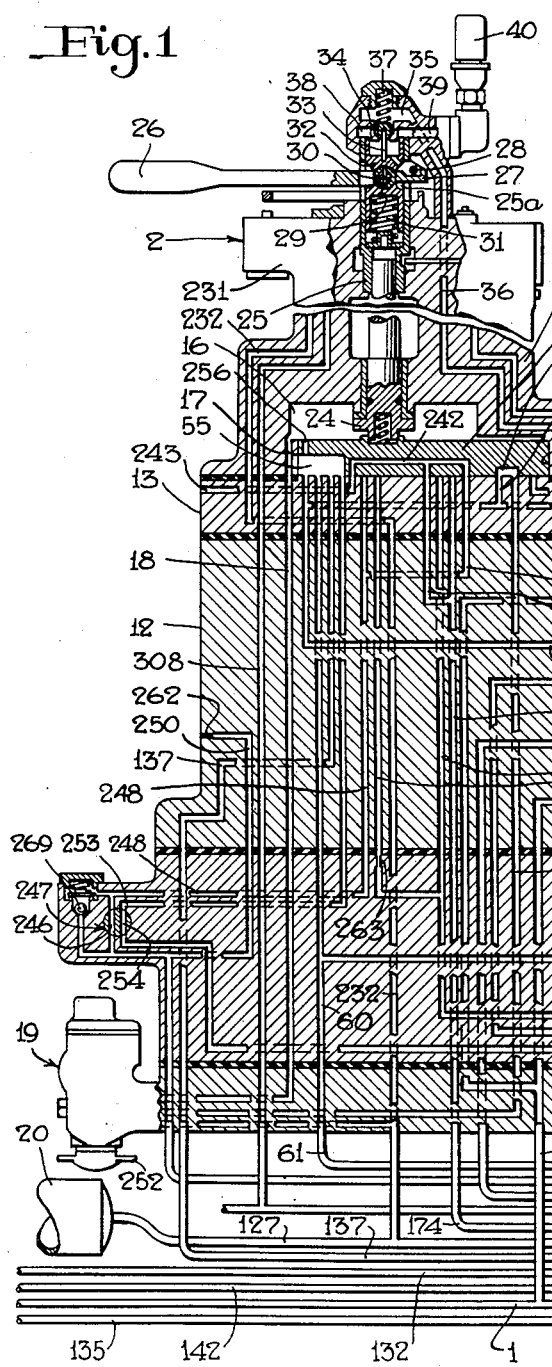
Figure 2:
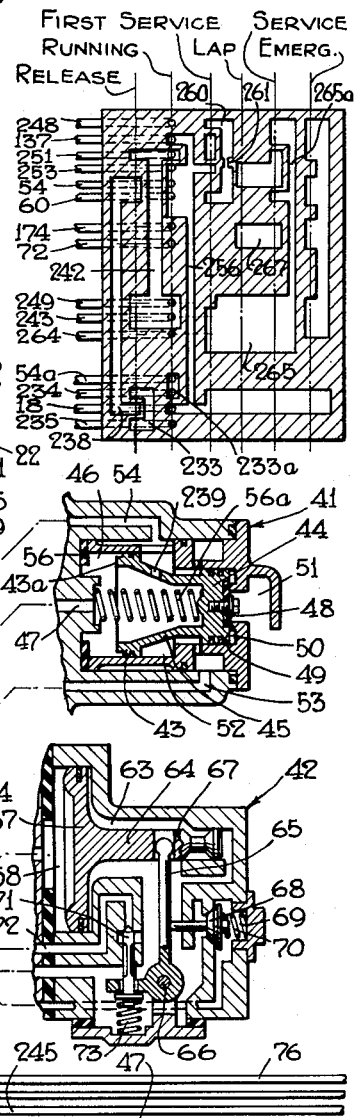
Figure 1B:
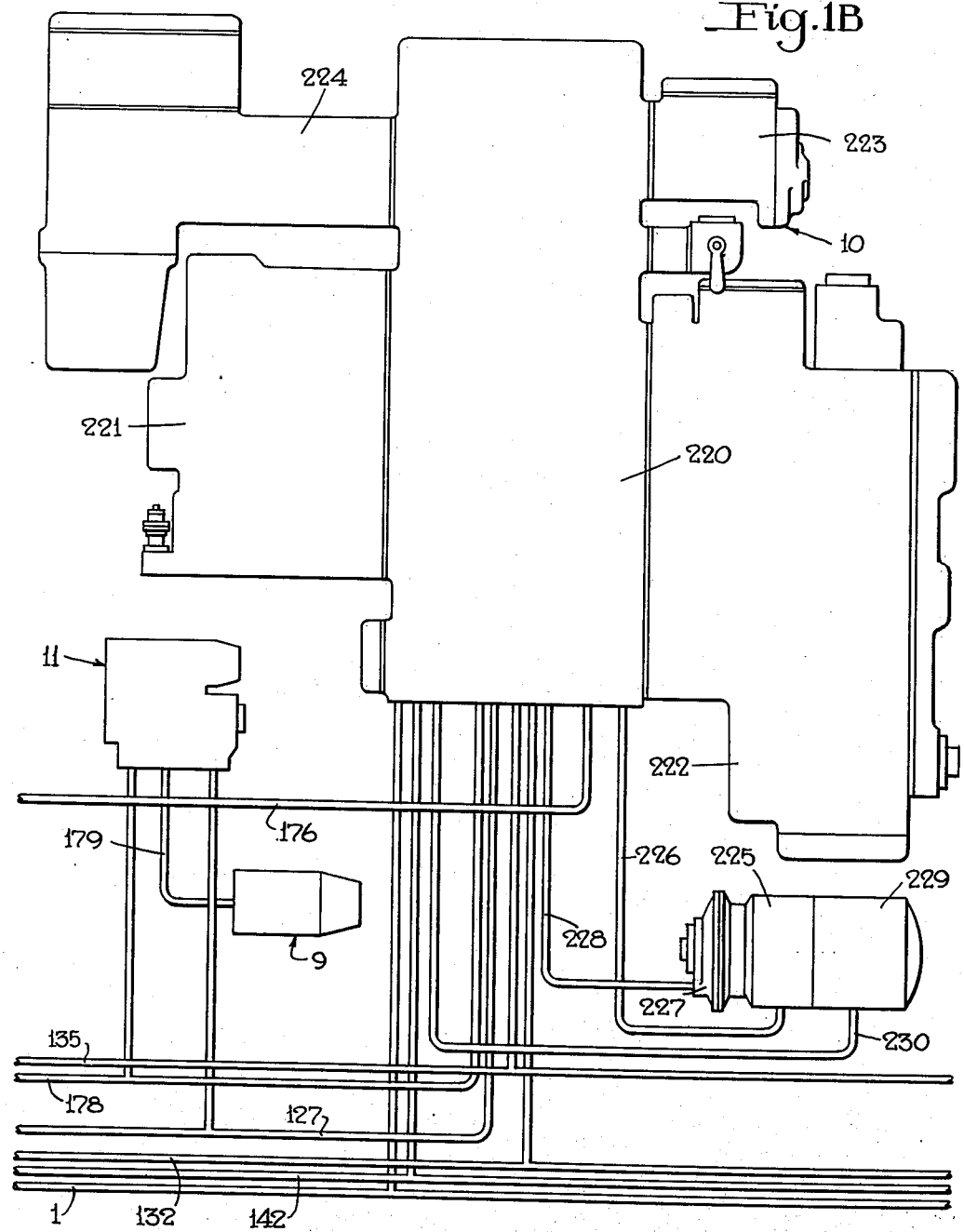

In the accompanying drawings; Figs. 1, 1A and 1B, when taken together and placed side by side, is a diagrammatic view, mainly in section, of a locomotive brake equipment embodying the invention; Fig. 2 is a diagrammatic development view of a rotary valve and a rotary valve seat of a brake valve shown in Fig. 1; and Fig. 3 is a diagrammatic development view of a rotary valve and rotary valve seat of a selector valve device shown in Fig. 1A.

DESCRIPTION OF PARTS

As shown in the drawings, the locomotive brake equipment comprises a brake pipe 1, an automatic brake valve device 2, an independent brake valve device 3, a selector valve device 4, an over speed magnet valve device 5, a sanding valve device 6, an interlock valve device 7 and a deadman's foot valve device 8.

The brake equipment further comprises a brake cylinder device 9 under the control of a brake controlling valve device 10 acting through the medium of a relay valve device 11 to control the brakes on the locomotive. As will appear in the following description, there are associated with the above equipment for cooperation therewith a plurality of reservoirs, check valves and the like.

The automatic brake valve device 2 is provided for the engineman to control the brakes on the locomotive automatically through the medium of the brake pipe 1 and its operation is substantially the same as the automatic operation disclosed in Patent No. 2,106,483, issued to Ellis E. Hewitt on January 25, 1938. Consequently only so much of the operation as is necessary to a clear understanding of the present invention will be described.

As shown in Fig. 1 of the drawings, the automatic brake valve device 2 comprises a pipe bracket 12 upon which is mounted a rotary valve seat portion 13 which supports a rotary valve casing portion 14 and which are rigidly secured together by the usual bolting means (not shown). The rotary valve casing portion 14 has a bore 15 which at its upper end is open to a rotary valve chamber 16, which chamber may be connected by way of a port 17 in the casing and a passage 18 in the pipe bracket 12 to a feed valve device 19. The feed valve device 19 operates to supply fluid under pressure from a main reservoir 20 in a manner determined by the positions of a plug valve 21 in a selector cock 22 as set forth in Patent No. 2,424,480, issued to G. T. McClure on July 22, 1947, and will not be described herein.

In chamber 16 there is provided a rotary valve 23 and extending into said chamber and having actuating engagement with said valve is an operating shaft 24. The rotary valve 23 is provided to enable the engineman to control the brakes on the locomotive and a train on the usual automatic principle through brake pipe 1 and accordingly is rotatable by the engineman to a number of different control positions, namely, release position, first service position, lap position, service position, and an emergency position as illustrated in Fig. 2 of the drawings.

The shaft 24 extends into the lower end of a sleeve 25 which is journaled at one end in the casing portion 14, said sleeve having a driving connection with said shaft. Intermediate its ends the sleeve 25 is provided with a pair of oppositely arranged openings 25a. A brake valve handle 26 for rotating the shaft 24 to its various brake controlling positions extends through these openings 25a and is provided at its inner end with a hook 27 which is arranged to hook under a pin 28 secured in the sleeve 25 and extending across the mouth of the inner opening in said sleeve.

A plunger 29 is slidably mounted in sleeve 25 beneath the brake valve handle 26 and is urged into sliding engagement with a roller 30, rigidly mounted on said handle, by a spring 31 which is compressed between the sleeve and the plunger. A plunger 32 is slidably mounted in the sleeve 25 above the handle 26 and is provided with an upwardly extending pin 33 which engages a safety control valve 34. The valve 34 is contained in a chamber 35 which is connected to a passage 36 and also contains a spring 37 which at all times urges said valve toward its seated position in which it is shown in Fig. 1 of the drawings. When the brake valve handle 26 is held depressed by manual pressure against the pressure of spring 31 in the position shown, the spring 37 is permitted to seat the valve 34. Upon removal of manual pressure from the valve 26 the spring 31 is adapted to move the handle in a clockwise direction about the pin 28 to urge the plunger 32 in an upwardly direction and move the valve 34 away from its seat so as to connect chamber 35 to a chamber 38 within the plunger, which chamber 38 is open to atmosphere by way of passage 39 and a whistle 40.

The fit between the sides of openings 25a in sleeve 25, through which handle 26 extends, and said handle is such that upon movement of the handle in a horizontal plane the sleeve and thereby the shaft 24 will be turned with the handle.

The automatic brake valve device 2 further comprises an emergency application valve device 41 and a combined equalizing discharge valve device and maintaining valve device 42, the devices 41 and 42 being adapted to be mounted on the side of the pipe bracket 12 by any suitable bolting means (not shown).

As will hereinafter more fully appear, the brake application valve device 41 is provided for the purpose of effecting an emergency application of the brakes in the event of an adverse operating or traffic condition, which may be either an overspeed condition or an adverse safety control condition. The emergency application valve device 41 comprises a casing containing two pistons 43 and 44 positively connected together in spaced relation by a stem 45 and slidably mounted in suitable coaxially arranged bores in said casing, the piston 43 being of greater area than piston 44. The piston 43 has at its outer face a chamber 46 which is connected by a passage and pipe 47 to the interlock valve device 7. On the opposite or outer face of the piston 44 there is provided a valve 48 adapted to engage an annular seat rib 49 for closing communication between a chamber 50 provided around said seat rib and an atmospheric vent port 51. Between pistons 43 and 44 there is provided an annular chamber 52 which is connected adjacent to piston 44 with the pistons in the position shown, by way of a passage and pipe 53 to the brake pipe 1. The chamber 52 is connected adjacent the larger piston 43 to a passage 54 which leads to a brake pipe charging cavity 55 in the rotary valve 23 when said rotary valve is in the position shown and also leads to the combined equalizing discharge valve device and maintaining valve device 42. The pistons 43 and 44 are adapted to be moved from the position shown in an inwardly direction to a brake pipe venting position defined by the engagement of a seat rib 43a of the piston 43 with a gasket 56, in which position piston 44 is adapted to be disposed inward relative to the passage 53 so as to connect said passage to chamber 50 and thereby to the atmospheric vent port 51. In chamber 46 there is a spring 56a acting on pistons 43 and 44 for urging and normally holding said pistons in the outer position in which they are shown.

The combined equalizing discharge valve device and maintaining valve device 42 comprises an equalizing piston 57 having at one side a chamber 58 which is connected to a passage 59 leading to a passage 60. The passage 60 at one end is connected to a pipe 61 leading to an equalizing reservoir 62 while the other end of passage 60 terminates at the seat of the rotary valve 23.

At the opposite side of the equalizing piston 57 there is provided a chamber 63 which is connected to a branch of the passage 54 leading to the emergency application valve device 41.

The equalizing piston 57 is provided with a stem 64 extending through the chamber 63 and having its end slidably mounted and thereby guided in a suitable bore provided in the casing. A bell crank 65 in chamber 63 is rockably mounted on a pin 66 secured in the casing. The end of one arm of this bell crank is disposed in a recess 67 in the equalizing piston stem 64 for movement by and with said stem. At one side of this arm is provided a maintaining valve 68 having a stem extending into operative alignment with said arm. The maintaining valve 68 is contained in a chamber 69 and is provided for controlling communication between said chamber and the chamber 63. A spring 70 in chamber 69 acts on the valve 68 for seating the same, while the equalizing piston 57 is operative upon movement from a normal position shown in the direction of the right hand to actuate the bell crank 65 to unseat said valve.

A brake pipe discharge valve 71 slidably mounted in the casing is provided for controlling communication between chamber 63 and a brake pipe discharge passage 72, said valve being operatively connected to the other arm of the bell crank 65 whereby upon movement of the equalizing piston 57 in the direction of the left hand, as viewed in the drawing, said bell crank will unseat said valve. A spring 73 acting on discharge valve 71 is provided for seating same when bell crank 65 and equalizing piston 67 are in their normal positions shown, under which conditions the maintaining valve 68 is also seated by the spring 70.

The foot valve device 8 comprises a casing containing a flexible diaphragm 74 adapted to cooperate with a valve seat 75 to control communication between a pipe 76 leading to the passage 36 in the brake valve device 2 and a pipe 77 leading to the interlock valve device 7. For controlling the position of the diaphragm 74 there is provided a bell crank 78 which is pivoted in the casing and which is provided with a horizontally extending pedal 79 adapted when subject to foot pressure by the engineman to move the diaphragm 74 into sealing engagement with valve seat 75 for closing communication between the pipes 76 and 77. A spring 80 is interposed between the casing and the bell crank 78 for operating the bell crank upon release of foot pressure thereon in a direction away from the diaphragm 74 to permit said diaphragm to flex away from valve seat 75 and thereby open communication between the pipes 76 and 77.

The independent brake valve device 3 is similar to that disclosed in Patent No. 2,173,940 issued to E. E. Hewitt et al. on September 26, 1939, and comprises a casing having a chamber 81 containing an operating shaft 82 carrying a cam sleeve 83. The lower end of the shaft 82 is journaled in the casing, while the upper end has a driving connection with a sleeve 84 which is also journaled in the casing and which carries at its upper end an operating handle 85. This handle extends through suitable slots provided in the opposite sides of sleeve 84 and the inner end of the handle is pivotally connected to a pin 86 carried by said sleeve, the sides of said slot cooperating with the handle to effect rotation of the sleeve 84 and thereby shaft 82 and cam sleeve 83 upon movement of the handle 85 in a horizontal plane. A plunger 87 is slidably mounted in sleeve 83 beneath the handle 85 and is urged into engagement with said handle by a spring 88.

The cam sleeve 83 is provided at its lower end with a cam 89 for engaging a stem 90 of a cut-off valve 91 which is contained in a chamber 92, and in said chamber there is provided a spring 93 for urging said valve toward its seated position. Immediately above the cam 89 the cam sleeve 83 is provided with cam 94 which engages a plunger 95 of a self-lapping straight air application and release valve mechanism 96 which is operative by said plunger upon movement in the direction of the right hand to supply fluid to chamber 81 at a pressure depending upon the extent of such movement. Upon movement of plunger 95 in the direction of the left hand the operation of the valve mechanism 96 is adapted to reduce the pressure in chamber 81 to a degree depending upon the extent of such movement. In the position in which the plunger 95 is shown the self-lapping application and release valve mechanism 96 is adapted to be conditioned to effect a complete release of fluid under pressure from chamber 81.

Within the lower end of sleeve 84 there is mounted a member 97 adapted to turn with said sleeve and having a cam 98 provided for engagement with a stem 99 projecting from an application delay valve 100, said stem extending through a suitable slot provided in the lower end of said sleeve. The application delay valve 100 is contained in a chamber 101 and a spring 102 in said chamber acts on said valve for urging it to its seat. The delay valve 100 is provided for controlling communication between the chamber 101 and an atmospheric port 103.

In Fig. 1A the independent brake valve handle 85 and other parts of the independent brake valve device, just described, are shown in their release position, which they normally occupy. The handle 85 is movable from the release position in one direction into an application and release zone for operating the self-lapping straight air application and release valve mechanism 96 to supply fluid to chamber 81 at a pressure dependent upon the disposition of said handle in said zone. Upon movement of the handle back toward the release position, the application and release valve mechanism 96 is adapted to operate to vent fluid under pressure from chamber 81 to an extent depending upon the position of the handle with respect to the release position, and at the time the release position is obtained said mechanism is adapted to provide for complete venting of chamber 81. To accomplish this operation the cam 94 operating the plunger 95 is designed to vary the position of said plunger in accordance with the position of the brake valve handle.

It will be understood that the cam 89 is so designed that the cut-off valve 91 will be maintained open during movement of handle 85 in the application and release zone, while the cam 98 for controlling the delay valve 100 will effect opening of said valve promptly upon movement of the handle out of a locking position, in which said handle is locked down, into release position and maintain said valve open in the application and release zone. In other words, the valve 91 is closed only in the release position of handle 85 while the valve 100 is closed in locking and release positions only.

Below the handle 85 there is provided a bail 104 over which the handle is adapted to turn upon movement to its different positions. The bail 104 is pivoted on a pin 105 in the casing of the brake valve device 3, and at a point remote from said pin is supported on a plunger 106 which is slidably mounted in the brake valve casing. The plunger 106 is carried by a spring 107 supported in a valve 108 which is contained in a chamber 109 open to the atmosphere through a vent port 110. The valve 108 has a stem extending into a chamber 111 where it engages the fluted stem of an oppositely disposed valve 112 contained in a chamber 113. A spring 114 in chamber 113 acts on the valve 112 for normally urging it to its seated position and for unseating the valve 108, as shown, and is of sufficient strength to normally support the plunger 106 and bail 104 in the position shown through the medium of spring 107.

The handle 85 is adapted to be turned on pin 86 against the pressure of spring 88 on plunger 87 in a counter-clockwise direction into engagement with the bail 104 for effecting movement thereof in a downward direction, and this movement, acting through the plunger 106 and spring 107, is adapted to effect seating of the valve 108 and unseating of the valve 112 against spring 114. The release of manual pressure on handle 85 is adapted to permit operation of the spring 114 to seat valve 112 and unseat the valve 108.

The selector valve device 4 comprises a casing having a chamber 125 which is connected by way of a passage 126 to a pipe 127 leading from the main reservoir 20 to chamber 113 in the independent brake valve device 3. Contained in the chamber 125 is a rotary valve 128 having three different control positions, namely, a freight position for control of braking a long train such as one composed of 50 or more freight cars, a lap position for braking a locomotive which is not the leading unit in the train, and a passenger position for control of braking of short freight, or passenger, trains. A hand operated handle 129 is operatively connected to the rotary valve 128 for turning same to its several positions.

In freight position in which the rotary valve 128 is shown in Fig. 1A a cavity 130 in said rotary valve connects a pipe and passage 131 leading from chamber 92 in the independent brake valve device 3 to an independent application and release pipe connection 132 for brake controlling valve device 10, an atmospheric port 133 in the rotary valve seat is blanked off; a port 134 extends through said rotary valve, thereby connecting chamber 125 to a controlled emergency pipe connection 135 for the valve device 10, a branch of which connection 135 leads to chamber 101 in the independent brake valve device 3; a cavity 136 connects a pipe and passage 137, leading from the seat of the rotary valve 23 to the automatic brake valve device 2, to a passage and pipe 138 leading to a suppression reservoir 139; and, a cavity 140 connects a passage and pipe 141 leading from the chamber 111 in the independent brake valve device 3 to an actuating pipe connection 142 for the valve device 10.

The interlock valve device 7 comprises a pipe bracket 145 on which are mounted by suitable bolting means (not shown) a cut-off valve device 146, an application insuring valve device 147, an overspeed application valve device 148, and an overspeed suppression valve device 149. Since these valve devices are identical in construction, it is believed that a description of valve device 146 will be sufficient for all and corresponding similar parts in the other valve devices mounted on bracket 145 will be given the same numbers.

The cut-off valve device 146 comprises a casing between two sections of which is clamped at its periphery a diaphragm 150. At one side of the diaphragm 150 is a fluid pressure control chamber 151 while at the other side is a spring chamber 152 which is open to atmosphere by way of a vent port 153. Contained in chamber 152 is a follower 154 for the diaphragm 150, which follower has a stem 155 extending through said chamber and a suitable bore in the casing, with which said stem makes sliding and sealing engagement, and into a valve chamber 156. A spring 157 encircles the stem 155 and engages the follower in such a manner as to constantly urge said follower and diaphragm 150 upwardly toward the position in which they are shown in Fig. 1A.

Contained in chamber 156 is a valve 158 slidably guided by means of its fluted stem in a coaxial bore 159 formed in a valve member 160, through which bore communication may be established between chamber 156 and a chamber 161. The valve 158 is operatively connected to the lower end of the stem 155 of the follower 154 and is adapted to be operated thereby to control the communication through the bore 159.

The valve member 160 is slidably mounted in a suitable bore in the casing of the valve device 146 and intermediate its ends defines an annular chamber 162 in said bore which may be connected to the chamber 161. The valve member 160 comprises a valve 163 contained in the chamber 161 and adapted to control communication between chambers 161 and 162. Contained in the chamber 161 is a spring 164 which operatively engages the valve 163 so as to constantly urge said valve toward its normal seated position shown in Fig. 1A of the drawings. As will hereinafter appear, valve 163 will be caused to be unseated when pressure of fluid supplied to control chamber 151 acting on diaphragm 150 will be sufficient to overcome the sequentially opposing pressures of springs 157 and 164.

Considering now the relation of valve device 146 to the other valve devices embodying this invention, chamber 151 is constantly in open communication with chamber 161 in the application insuring valve device 147 by way of a passage 165. Chamber 156 is cut-off valve device 146 is connected to chamber 46 in the emergency application valve device 41 by way of a passage 166 and pipe and passage 47, a branch of passage 166 leading to a check valve device 167 which permits flow only in a direction toward passage 166, and also leading to a choke 168 by-passing said check valve device, both said choke and check valve device being open to a timing reservoir 169 by way of a branched conduit 170. Chamber 162 in the valve device 146 is connected to chamber 162 in the application insuring valve device 147 by way of a passage 171 which passage opens to an atmospheric port 172, to chamber 156 in valve device 148, to chamber 162 in valve device 149, and to a choke 173 which is adapted to restrict flow of fluid under pressure from a passage 174 leading to chamber 151 in valve device 149 and to a pipe and passage 174 leading to the seat of the rotary valve 23 in the brake valve device 2. Chamber 161 in the valve device 146 is in constant open communication with diaphragm foot valve 8 by way of passage 175 and pipe 77. A branch of passage 175 leads to chamber 156 in the overspeed suppression valve device 149.

Referring now to application insuring valve device 147, chamber 151 is connected to the brake controlling valve device 10 by way of an emergency application pipe and passage 176, which pipe is adapted to be supplied with fluid under pressure from valve device 10 when an emergency application is effected. Chamber 156 in valve device 147 is connected by way of a passage 177 to a control pipe 178 which leads to the controlling valve device 10 and relay valve device 11. This pipe 178 is adapted to conduct fluid under pressure from the valve device 10 to the relay valve device 11 to effect the operation of valve device 11 to supply fluid under pressure to the brake cylinder device 9 by way of pipe 179 and thus effect an application of the brakes.

Referring now to valve device 148, chamber 151 therein is connected by way of a passage and pipe 181 to an overspeed timing reservoir 182. Chamber 162 is in constant open communication by way of a passage 184 with chamber 161 in valve device 149. Chamber 161 in valve device 148 is always open to atmosphere by way of passage 184a.

Upon referring to valve device 149 it will be seen that chamber 151 is connected to passage 174, chamber 156 is connected to passage 175 which is open to pipe 77 leading to diaphragm foot valve 8, chamber 162 is connected to passage 171, which is open to atmosphere by way of vent port 172.

The sanding valve device 6 is of the same construction as the cut-off valve device 146 but in order to avoid confusion corresponding similar parts will be given different reference characters. A diaphragm 185 corresponding to diaphragm 150 in valve device 146 has at one side a control chamber 186 which is connected to the chamber 151 in valve device 147 by way of pipe and passage 176 which, as previously noted, is also the emergency application pipe 176 leading from the brake controlling valve device 10. At the other side of the diaphragm 185 is a chamber 187, which is always open to atmosphere by way of a vent port 188. A spring 189 is operatively mounted in chamber 187 so as to constantly urge a follower 190 for diaphragm 185 in an upwardly direction. A valve 191 is operatively connected to the lower end of a stem 192 of said follower and is disposed in a chamber 193, which corresponds to chamber 156 in valve device 146 and is connected to main reservoir 20 by way of a passage 127 and pipe 194. The stem of valve 191 is slidably mounted in a coaxial bore 195 through a valve member 196 and is adapted to control communication between chamber 193 and chamber 197, to which said bore leads. The valve member 196 is slidably mounted in a suitable bore in the casing and comprises a valve 198 disposed in the chamber 197 which chamber is connected to a reservoir 199 by way of a passage and pipe 200, said valve cooperating with said bore to control communication between chamber 197 and an annular chamber 201 defined in said bore about a reduced portion of the valve member, the chamber 201 being connected to sanding pipe 183. A spring 202 operatively disposed in chamber 197 constantly urges valve 198 upwardly toward its normal seated position in which it is shown in Fig. 1A.

The overspeed magnet valve device 5 is provided for operation a short period of time after the occurrence of an adverse traffic condition, such as an overspeed condition for example, to initiate a brake application upon an indication, from an overspeed detector apparatus (not shown or a part of this invention), that a locomotive, with which said apparatus is associated, is being operated at a speed in excess of that which is selected to be a safe traffic condition. The overspeed magnet valve device 5 comprises a double beat valve 205 contained in a chamber 206 which is connected by way of one branch of a passage and pipe 207 to a whistle 208 and by way of another branch to a check valve 209 adapted to seat against pressure of fluid in pipe 207. A choke 210 is arranged to by-pass check valve 209 in a communication to the timing reservoir 182. The valve 205 is provided with a fluted stem 211 which extends into a chamber 212 which is connected to main reservoir 20 by pipe 127. Valve 205 is also provided with another fluted stem 213 oppositely arranged and extending into a chamber 214 which is constantly open to atmosphere through a vent port 215. A magnet 216 is normally energized by means of conduits 216a and 216b leading from an overspeed detector apparatus (not shown) which may be one such as that disclosed in Patent No. 2,017,682, issued to E. S. Cook on October 15, 1935, under which condition an armature 217 thereof holds the valve 205 in its lower seated position, in which chamber 206 is cut off from chamber 212 and is opened to atmospheric chamber 214. A spring 218 is operatively mounted in chamber 212 for actuating valve 205 to its upper seated position when the magnet 216 is deenergized, in which position communication from chamber 205 to 214 is closed and communication between chambers 205 and 212 is opened.

The brake controlling valve device 10 comprises a pipe bracket 220, an emergency application valve device 221 mounted on one face of said bracket and adapted to be controlled by variations in the pressure of fluid in the brake pipe 1, a service application valve device 222 mounted on an oppositely directed face of said bracket and adapted to be controlled by the same variations in fluid pressure, a delayed emergency valve device 223 mounted on said bracket above the valve device 222 which is adapted to operate in response to pressure of fluid supplied through the pipe 142 to delay the development of braking power on the locomotive when used in a long train, such as 75 or more cars, until after the slack in the train has gathered, and an independent application and release valve device 224 mounted on said bracket above valve device 221 and adapted to operate in response to fluid pressure in pipe 132 to effect a release of the brakes on the locomotive only. This brake controlling valve device 10 may be similar to that disclosed in Patent No. 2,173,940, issued September 26, 1939, to E. E. Hewitt et al., and assigned to the assignee of the present invention.

It will, of course, be understood that this device 10 operates upon a service rate of reduction in the pressure of fluid in the brake pipe 1 to deliver fluid under pressure supplied from an auxiliary reservoir 225 by way of a pipe 226 to a displacement reservoir 227 by way of pipe 228 and also to the relay valve device 11 by way of a pipe 178, and upon an emergency rate of reduction in brake pipe pressure to also deliver fluid under pressure supplied from an emergency reservoir 229, by way of a pipe 230, to effect an emergency application of the brakes and to deliver fluid under pressure to the emergency application pipe 176 to effect sanding, and upon an increase in brake pipe pressure to effect a release of the brakes and charging of the brake equipment.

The communications established by the brake valve rotary valve 23 are diagrammatically indicated in Fig. 2 while those established by the selector rotary valve 128 are diagrammatically indicated in Fig. 3.

OPERATION

Charging of brake equipment

In operation, fluid under pressure is supplied to the main reservoir 20 and thence to the main reservoir pipe 127 in the usual manner. From pipe 127 fluid at main reservoir pressure is supplied to feed valve device 19 and to a sanding mechanism 231 by way of a passage 232 in the bracket 12 of the brake valve device 2. Also, from pipe 127 fluid under pressure from the main reservoir is supplied to chamber 113 and to the self-lapping valve mechanism 96 in the independent brake valve device 3, to chamber 125 in the selector valve device 4 by way of passage 126, to chamber 212 in the magnet valve device 5, to chamber 193 in the sanding valve device 6, to the relay valve device 11, and to the brake controlling valve device 10.

Fluid thus supplied at main reservoir pressure to chamber 125 in the selector valve device 4, with rotary valve 128 of said valve device positioned as shown in Fig. 1A, flows by way of port 134 in rotary valve 128 and through pipe 135 to the delayed emergency valve device 223 of the brake controlling valve device 10.

Fluid at main reservoir pressure thus supplied to chamber 193 in the sanding valve device 6 flows past the valve 191, through bore 195 in valve member 196 to chamber 197, whence it flows by way of passage and pipe 200 to sanding reservoir 199.

In initially charging the equipment, the handle 26 of the automatic brake valve device 2 is turned first to the release position, and, after a period of time has elapsed, it is then turned to running position.

When the rotary valve 23 is in release position, the feed valve device 19 operates selectively to either supply fluid from main reservoir pipe 127 to feed valve passage 18, and thence to rotary valve chamber 16, at main reservoir pressure, or, at a pressure desired to be carried in brake pipe 1.

As described and claimed in the aforementioned Patent No. 2,424,480, the position of the plug valve 21 in the selector cock 22 when the rotary valve 23 is in release position determines the pressure at which fluid is supplied to chamber 16. In release position of the rotary valve 23 a cavity 233 (Fig. 2) in the rotary valve 23 connects feed valve control passage 234 to a passage 235 leading to the selector cock 22. If the plug valve 21 in the selector cock 22 is positioned as shown in Fig. 1, the control passage 234 is open to atmosphere by way of port 233, passage 235, a waterway 236 in plug valve 21, and a vent port 237. With the plug valve 21 positioned so that the waterway 236 connects passage 54 to passage 235, the control passage 234 is supplied with fluid at the pressure in rotary valve chamber 16, by way of a port 238 and cavity 55 in rotary valve 23, passage 54, waterway 236, passage 235 and cavity 233. Fluid at a normal feed valve pressure, or brake pipe pressure, causes the feed valve 19 to operate to supply fluid to pasage 18 at a controlled feed valve pressure such as 70 pounds. However, at initial charging, all pipes and passages, including control passage 234, will be at atmospheric pressure and consequently passage 18 will be initially supplied by feed valve device 19 with fluid at main reservoir pressure regardless of the position of the plug valve 21 in selector cock 22.

With the rotary valve 23 in release position fluid under pressure supplied from chamber 16 to cavity 55 by way of the port 238 in the rotary valve flows by way of a branch of passage 54 to chamber 52 in the emergency application valve device 41. Fluid under pressure thus supplied to chamber 52 flows by way of passage and pipe 53 to brake pipe 1, thence it flows to brake controlling valve device 10 and operates the emergency application valve device 221 and service application valve device 222 thereof to charge the emergency reservoir 229 and auxiliary reservoir 225, respectively, by way of their respective pipes 230 and 228 in a manner such as that described in Patent No. 2,173,940, issued to E. E. Hewitt et al. on Sept. 26, 1939.

Fluid under pressure supplied from passage 54 to chamber 52 also flows by way of a choke 239 in piston 43 to chamber 46, whence it flows by way of passage and pipe 47, choke 168 and conduit 170 to timing reservoir 169. From pipe 47 fluid under pressure also flows by way of passage 166 to chamber 156 in cut-off valve device 146, thence it flows past valve 158 through bore 159 in valve member 160 to chamber 161 and thence by way of passage 175 and pipe 77 to a chamber 240 in deadman's foot valve 8.

It should be understood that in order to effect the charging of the brake equipment in the manner described herein it is not only necessary that the handle 26 of the brake valve device 2 be in release or running position but also that at the same time either the handle 26 or the peddle arm 79 of the deadman's foot valve device 8 must be held depressed. Also, it should further be understood that train speed conditions must be favorable and the magnet 216 of the overspeed magnet valve device 5 is as a consequence energized, holding the valve 205 in its lower seated position in which it is shown in Fig. 1A.

Fluid under pressure in charging cavity 55 also flows by way of another branch of passage 54 to chamber 63 and by way of passages 60 and 59 to piston chamber 58 in the equalizing discharge valve device 42. Fluid under pressure thus supplied to passage 60 also flows by way of pipe 61 to equalizing reservoir 62.

In the rotary valve 23 of the automatic brake valve 2 there is provided a cavity 242, which in release position of said valve is connected to an exhaust port 243. A reduction limiting reservoir 244 is connected to cavity 242 by way of a pipe and passage 245, a port 246 in a plug valve 247, a passage 248, and a branch passage 249 thereof when the rotary valve is in release position. It will be noted that pipe and passage 245 is also open to atmosphere by way of a passage 250 and choke 252.

A branch passage 251 of pipe and passage 174 in bracket 12, leading from control chamber 151 in the overspeed suppression valve device 149, is also connected to atmosphere by way of cavity 242 and exhaust port 243.

After a sufficient lapse of time the brake valve handle 26 and consequently rotary valve 23 are moved from release to running position. With the rotary valve 23 in running position, rotary valve chamber 16 is connected to feed valve control passage 234 by way of a cavity 233a in the rotary valve (Fig. 2). Consequently in accordance with the disclosure of Patent No. 2,424,480, regardless of the position of the plug valve 21 in the selector cock 22, the feed valve 19 now operates to supply fluid by way of passage 18 and port 17 in the casing to rotary valve chamber 16 at feed valve pressure determined by the setting of an adjusting handle 252 on feed valve device 19.

In this position of the rotary valve 23, a port 256 and cavity 55 therein establish communication from the rotary valve chamber 16 to the passage 54. Consequently chambers 52 and 46 in application valve device 41, the brake pipe 1, the timing reservoir 169 and chamber 240 in the deadman's foot valve device 8 become charged with fluid at feed valve pressure.

With the fluid pressures acting on opposite sides of the piston 43 thus equalized, spring 56a acts on the piston 44 to hold valve 48 in its normal position in seating engagement with seat rib 50.

Also, in running position port 256 and cavity 55 in rotary valve 23 establish communication from rotary valve chamber 16 to passage 60 and consequently equalizing reservoir 62 and piston chamber 58 in equalizing discharge valve device 42 which becomes charged with fluid at feed valve pressure. Since chamber 63 is open to passage 54 the fluid pressures acting on opposite sides of equalizing discharge valve piston 57 become substantially equal when the equipment is fully charged, so that the several parts of the valve device 42 will remain in their normal position as shown in Fig. 1.

In running position of the rotary valve 23, port 256 and cavity 55 also establish communication from the rotary valve chamber 16 to maintaining chamber 69 in the valve device 42 by way of a passage 253, a port 254 in plug valve 247 and a passage 255, consequently chamber 69 is charged with fluid at feed valve pressure. Port 256 and cavity 55 also establish communication by way of pipe and passage 137 between chamber 16 and the seat of the rotary valve 128 of the selector valve device 4, whence fluid under pressure may flow by way of a cavity 136 in said valve and pipe 138 to suppression reservoir 139 when said valve is in the position shown in Fig. 1A for reasons which will appear later.

Also cavity 242 continues to open reduction limiting reservoir 244 and control chamber 151 in the overspeed suppression valve device 149 to atmosphere by way of the port 243.

Service application of brakes

In order to effect a service application of the brakes on the locomotive on the automatic principle the engineman may move the handle 26 either directly from running position to service position, or, first to first service position and then to service position. The service position may be employed to effect a straight away full service application of the brakes on the locomotive and train, but particularly in the braking of the long freight trains, such operation is considered undesirable due to the possibility of rough gathering of slack in the train and consequently the possibility of damaging cars which will result therefrom. It is therefore preferred that in handling long trains the engineman first move the brake valve handle 26 to first service position for effecting a light controlled reduction in brake pipe pressure and consequently a light application of the brakes on the train to cause a gentle gathering of the slack in the train, following which he may move the brake valve handle to service position for completing the reduction thereby effecting what is commonly known as a split reduction, which will now be described.

When the brake valve handle 26 and the rotary valve 23 are moved to first service position, the equalizing reservoir 62 and equalizing discharge piston chamber 58 connected thereto by pipe 61, passage 60 and passage 59 are connected through a cavity 260 having the usual service choke 261 therein in the rotary valve 23 (Fig. 2) to passage 248, and thence through port 246 in plug valve 247, which is positioned for braking a long train, to passage and pipe 245 and to reduction limiting reservoir 244. Since this reduction limiting reservoir at this time is at atmospheric pressure the pressure of fluid in the equalizing reservoir 62 and in the equalizing piston chamber 58 is adapted to equalize at a service rate into said reduction reservoir, the consequent reduction in equalizing reservoir pressure being sufficient to cause a light reduction in brake pipe pressure and thus a light application on locomotive and train in the usual manner.

It will be noted that the reduction limiting reservoir 244 at this time is also open to atmosphere by way of pipe and passage 245 and passage 250 restricted by choke 262, but this choke is small and merely acts to continue the reduction of equalizing reservoir pressure at a slow rate after equalization into the reduction limiting reservoir at a service rate as just described.

When the pressure in the equalizing piston chamber 58 is reduced as just described, brake pipe pressure in chamber 63 at the opposite side of the equalizing piston 57 effects movement of said piston in the direction of the left hand to actuate the bell crank 65 to unseat the brake pipe discharge valve 71. The chamber 63 being in communication with the brake pipe 1 through application valve device 41, the unseating of the brake pipe discharge valve 71 permits fluid under pressure to flow from the brake pipe to the atmosphere through passage 72, a service choke 263, a passage 264, a cavity 265 in the rotary valve 23 and thence through the atmospheric passage 243, for thereby effecting a service rate of reduction in brake pipe pressure to initiate a service application of the brakes on the locomotive and cars of the train.

On the locomotive the service application valve device 222 responds to a service reduction in brake pipe pressure to supply fluid under pressure from the auxiliary reservoir 225 by way of pipe 228 to the relay valve device 11 by way of pipe 178 for operating same to supply fluid under pressure by way of pipe 179 to the brake cylinder device for initiating the application of brakes on the locomotive.

When the brake pipe pressure in chamber 63 acting on the equalizing piston 57 becomes reduced by flow past discharge valve 71 to a degree substantially equal to the reduction in equalizing reservoir pressure in chamber 58, the spring 73 acting on the brake pipe discharge valve 71 moves same toward its seat to throttle further venting of fluid under pressure from the brake pipe to a rate substantially equivalent to the very restricted venting of fluid under pressure from the equalizing reservoir 244 through choke 262 in pipe bracket 12 to thereby substantially limit the first reduction in brake pipe pressure to a degree equal to the equalization of equalizing reservoir pressure into the reduction limiting reservoir.

In the brake controlling valve device 10 the service application valve device 222 then operates in the usual manner to limit the reduction in auxiliary reservoir pressure due to flow to the relay valve device 11, to the same degree as the reduction in brake pipe pressure for thereby limiting the degree of brake application on the locomotive so as to cause a gentle gathering of the slack in the train.

In case there is leakage of fluid under pressure from the brake pipe 1 and consequently from chamber 63 at the brake pipe side of the equalizing piston 57, said piston will operate to limit the degree of opening of the discharge valve 71 so that the brake pipe pressure will not reduce at a rate exceeding the rate of reduction in equalizing pressure in chamber 58 at the opposite side of the equalizing piston 57.

However if the brake pipe leakage is excessive and tends to reduce brake pipe pressure at a rate exceeding the service rate of reduction in the equalizing reservoir pressure, the brake pipe pressure in chamber 63 will tend to become lower than equalizing reservoir pressure acting on the opposite side of the equalizing piston 57, and as a consequence, the reservoir pressure will move said piston in the direction of the right hand and actuate the bell crank 65 to unseat the maintaining valve 68. In the first service position of the rotary valve 23 fluid at feed valve pressure is supplied from the rotary valve chamber 16 to the maintaining valve chamber 69 through port 256 in the rotary valve (Fig. 2), passage 253, port 254 in plug valve 247 and passage 255, so that with the maintaining valve unseated fluid under pressure will be supplied to the brake pipe to offset leakage of fluid under pressure therefrom. The maintaining valve will be opened by the equalizing piston 57 to a degree depending upon the degree of brake pipe leakage and sufficient to supply the required amount of fluid to the brake pipe to prevent the brake pipe pressure from reducing at a rate exceeding the rate of reduction in equalizing reservoir pressure and, as a result, excessive brake pipe leakage will not increase the rate of brake application above the desired service rate so that the gentle gathering of slack in the train is assured.

After the slack on the train has been gathered due to the application of brakes effected by the initial light reduction to brake pipe pressure, the brake valve handle 26 is turned to service position in which the supply of fluid under pressure to the maintaining valve chamber 69 through cavity 256 is cut off and in which the equalizing reservoir 62 and equalizing piston chamber 58 are connected directly to atmosphere through passage 60, a cavity and port 265a in rotary valve 23 and the atmospheric exhaust passage 243 and through this communication the reduction in pressure in the equalizing reservoir and equalizing piston chamber is continued until a full service reduction therein has been effected, after which the brake valve handle 26 is operated to turn the rotary valve 23 to lap position to lap passage 60 so as to prevent further and unnecessary venting of fluid under pressure from the equalizing reservoir and equalizing piston chamber.

The equalizing discharge valve device 42 responds to this further reduction of equalizing reservoir pressure to effect a corresponding additional reduction in brake pipe pressure and the service application valve device 222 of the brake controlling valve device 10 on the locomotive then operates to supply fluid under pressure from the auxiliary reservoir 225 to the relay valve device 11, as hereinbefore described, to increase the degree of brake application on the locomotive to a full service degree in the usual manner.

If the brake apparatus operates in the manner intended and as just described to effect an application of brakes on the locomotive, the interlock valve device 7 is conditioned to suppress a safety control application of the brakes permanently as will hereinafter more fully appear.

*Release of service application of brakes*

In order to effect a release of the brakes after an automatic service application thereof the brake valve handle 26 is returned to release position and moves the rotary valve 23 back to the release position shown in Figs. 1 and 2 of the drawings and in this position the brake pipe 1 is recharged with fluid under pressure and the service application valve device 222 of the brake controlling valve device 10 is thereby operated to effect operation of the relay valve device 11 to release fluid under pressure from the brake cylinder device 9 for releasing the brakes on the locomotive in a manner which is apparent from the description given in the aforementioned Patent No. 2,106,483 in connection with the charging of the equipment.

*Graduated release of an automatic service application and subsequent automatic re-application*

Particularly in braking passenger trains to bring them to a stop at a desired relatively high rate of deceleration but without material shock to either the vehicle or passengers it is customary on certain railroads to initially effect a full service automatic application of the brakes and then graduate the application off by moving the brake valve handle 26 successively from lap position to release position and then back to lap position in order to increase the pressure in the brake pipe 1 in such increments as required to effect operation of the brake controlling valve device 10 and relay valve device 11 to reduce the pressure in the brake cylinder device 9 in desired steps. With this type of control the brake cylinder pressure may be so depleted before the stop is obtained that it is necessary to make another or further light application of brakes to bring the train to the desired stop.

In order to condition this brake equipment so that the brakes may be controlled automatically in the manner just described, the plug valve 247 is placed in a position in which the passages 254 and 246 are closed, thereby rendering the brake pipe maintaining feature and the split reduction feature described in connection with first service position of brake valve handle 26 of the brake valve device 2 ineffective. The rotary valve 128 of the selector valve device 4 is placed in "passenger" position in which communications are established as shown in Fig. 3. As will appear later the selector valve device 3 in this "passenger" position connects controlled emergency pipe 135 to atmospheric port 133 by way of a port 266 (Fig. 3), thereby nullifying the controlled emergency feature in passenger service. Also, the suppression reservoir passage 138 is lapped thus providing for an automatic emergency application of the brakes in the event of an overspeed train control or a safety control application.

Fluid under pressure supplied to the reduction limiting reservoir 244 in effecting an automatic service application of brakes is vented therefrom in lap and release position of the brake valve rotary valve 23 by way of pipe and passage 245, past a check valve 269, passage 243, passage 249, cavity 265 in the rotary valve 23 in lap position (Fig. 2), and atmospheric passage 243, cavity 242 being employed in release position instead of cavity 265. By this arrangement the reduction limiting reservoir 244 will be promptly vented while graduating a release of brakes by moving the brake valve handle 26 back and forth between the release and lap positions and thus be in condition to effect a reduction in pressure in the equalizing reservoir 62 in a manner hereinbefore described in case the engineman moves the brake valve handle 26 to first service position to obtain an increase in the degree of brake application to stop the train as desired.

*Automatic emergency application of locomotive and train brakes*

If the engineman desires to effect an emergency application of the brakes on a locomotive and train, he may move the brake valve handle 26 to emergency position indicated in Fig. 2 and thereby turn the rotary valve 23 from a normal running position shown to a position in which charging passage 18 is lapped off to cut off the supply of fluid under pressure to the brake pipe 1. In this position of the handle 26 means (not shown) is operated thereby to effect a sudden emergency reduction in brake pipe pressure, such reduction occurring through the branch pipe 53 connecting the brake pipe 1 to the brake valve device.

On the locomotive the service application valve device 222 of the brake controlling valve device 10 responds to the emergency reduction in brake pipe pressure to supply fluid under pressure from the auxiliary reservoir 225 to the relay valve device 11 by way of the control pipe 178, and at the same time the emergency application valve device 221 operates to supply fluid under pressure from the emergency reservoir 229 by way of pipe 230 to pipe 178 leading to the relay valve device 11. The relay valve device 11 operates in response to pressure of fluid thus supplied thereto to supply fluid under pressure to the brake cylinder device 9 at a pressure corresponding to that of the actuating fluid for thereby applying the brakes on the locomotive in emergency.

With the rotary valve 128 of the selector valve device 4 in "freight" position as shown, fluid under pressure is supplied from chamber 125 of said valve device through port 134 in said rotary valve and passage and pipe 135 to the delayed emergency valve device 223 of the brake controlling valve device 10, in response to which the delayed emergency valve device operates to delay an emergency application of the brakes in order to avoid too rapid gathering of slack in the train, which might cause damage to the train.

As shown and described in Patent No. 2,173,940, issued on September 25, 1939, to E. E. Hewitt et al., the delayed emergency application may be avoided by the operation of the independent brake valve device 3. Upon movement of handle 85 out of release position into its application and release zone, the cam 94 will move into engagement with the stem 99 and then unseat the valve 100 and maintain the same unseated until the handle 85 is returned to release position. This of course will vent pipe 135 to atmosphere by way of port 103 and relieve the fluid pressure acting on valve device 223 and thus eliminate the delay in an emergency application.

It also will be noted that the same result may be obtained by moving the rotary valve 128 to passenger position in which pipe 135 is connected to atmospheric port 133 by way of a cavity 266 as shown in Fig. 3 of the drawing.

It will be further understood that, as set forth in Patent No. 2,256,283, issued to E. E. Hewitt et al. on September 16, 1941, a release of the brakes on the locomotive independently of the brakes on the train may be effected by depressing the handle 85 of the independent brake valve device 3 and thereby seating the exhaust valve 108 and unseating the supply valve 112. The unseating of the valve 112 permits fluid at main reservoir pressure supplied to chamber 113 to flow past said valve to chamber 111, thence it may flow through pipe 141, cavity 140 in rotary valve 128 and pipe 142 to the independent application and release valve device 224 of brake controlling valve device 10. In response to fluid pressure thus supplied valve device 224 operates to effect a release of fluid under pressure from the relay valve device 11 by way of control pipe 178 and thereby a release of fluid under pressure from brake cylinder device 9 by way of pipe 179 to release the brakes on the locomotive.

When it is desired to effect an automatic release of the brakes on the train after an emergency application, the brake valve handle 26 is operated to turn the rotary valve 23 back to release position and after a short period of time to running position shown for thereby again supplying fluid under pressure to brake pipe 1 for recharging same and for effecting operation of the service application valve device 22 to release the fluid under pressure from the relay valve device 11 and thereby the brake cylinder device 9 and for recharging the auxiliary reservoir 225 and emergency reservoir 229. The emergency application valve device 221 of the brake controlling valve device 10 is also returned to its release position upon recharging the brake pipe 1.

It should also be noted that, when an emergency application of the brakes is effected as just described, control pipe 178 is supplied with fluid under pressure which flows to chamber 156 in the application insuring valve device 147, whence it flows past valve 158, through bore 159 into chamber 161 and thence by way of passage 165 to chamber 151 in the cut-off valve device 146, which is operated thereby to close communication between pipe 47 and pipe 77. However, fluid under pressure is also supplied by way of pipe 176 to control chamber 151 in the application insuring valve device 147. Fluid pressure thus established in the last named chamber causes diaphragm 150 to deflect downwardly against the force of spring 157 thereby seating valve 158 on valve member 160 and unseating valve 163. Thus flow of fluid under pressure through control pipe 178 to chamber 151 in the cut-off valve device 146 is cut off and said chamber is vented to atmosphere by way of passage 165, chambers 161 and 162 in valve device 147, passage 171 and vent port 172. This nullifies the effect of the cut-off valve device 146 for reasons which will appear later.

Fluid under pressure supplied to emergency application pipe 176, also flows by way of a branch thereof to control chamber 186 in sanding valve device 6 for effecting sanding of the rails. In response to the pressure of fluid thus supplied to chamber 186 diaphragm 185 deflects downwardly against the pressure of spring 189. This movement of the diaphragm causes valve 191 to seat on valve member 196 and then to unseat the valve 198 thereon, thereby closing communication between chambers 193 and 201 and opening communication between chambers 201 and 197. Fluid under pressure in sanding reservoir 199 which is in open communication with chamber 197 through pipe 200 then flows past valve 198 to chamber 201, whence it flows to sanding pipe 183 for operating a sanding device not shown.

Safety control features

As hereinbefore mentioned either foot valve device 8 or the brake valve handle 26 in the brake valve device 2 must be held in a depressed condition by the engineman at all times when the brakes on the locomotive are released or when applied with a force less than a degree sufficient to insure the safety of the locomotive. When such a degree of application is obtained, the cut-off valve device 146 is operated as above described to close communication between pipe 47 and pipe 77 under which condition the engineman may remove manual pressure from the foot valve device 8 and brake valve handle 26 whichever is held depressed.

If at any time the engineman removes his foot from the pedal 79 of the foot valve device 8 and his hand from the handle 26 of the brake valve device 2 when the brakes on the locomotive are released or applied with a force less than that just mentioned, communication is established between chamber 46 of the emergency application valve device 41 on the brake valve device 2 and the atmosphere through passage and pipe 47, passage 166 in the interlock valve device 7, chamber 156 in the cut-off valve device 146, past valve 158, through bore 159 to chamber 161, thence to chamber 240 in the foot valve device 8 by way of passage 166 and pipe 77, past diaphragm 74 to pipe 76 leading to passage 36 in the brake valve device 2, then past safety control valve 34 therein to chamber 38 which is connected to whistle 40 by passage 39. Timing reservoir 169 being connected to pipe 47 by way of conduit 170 and choke 168 is also vented to atmosphere through the same communication and after a predetermined time, as determined by the size of the timing reservoir 169 with respect to the flow capacity of choke 239 in the application piston 43, the pressure of fluid in chamber 46 becomes sufficiently reduced to permit the pressure of fluid in chamber 52 acting on said piston to overcome the resistance of spring 56a and move the application valve 48 to its extreme left-hand position. In this position seat rib 43a on left-hand face of piston 43 is in engagement with the gasket 56, valve 48 is out of engagement with seat rib 49, and passage 53 connected to brake pipe 1 through branch pipe 53 will be open past unseated valve 48 to atmosphere by way of atmospheric vent port 51. In this position of the piston 43 fluid under pressure in brake pipe 1 flows to atmosphere at a rate fast enough to operate the brake controlling valve device 10 to effect an emergency application of the brakes in the manner hereinbefore described. In this position, also, flow of fluid under pressure from the feed valve 19 through passage 54 to the brake pipe 1 is cut off by the piston 44. If the rotary valve 128 of the selector valve device 4 is in "freight" position, there will be a preliminary light application of brakes on the locomotive for gathering slack on the train before the heavy application, that is to say a controlled or delayed emergency application. If the rotary valve 128 is in "passenger" position, there will be an immediate emergency rate of application of the brakes on the locomotive.

As previously noted, in effecting an application of the brakes the brake controlling valve device 10 operates to supply fluid under pressure to the relay valve device 11 by way of pipe 178. Fluid under pressure thus supplied to pipe 178 flows to chamber 151 in the cut-off valve device 146 by way of chamber 156 in the application insuring valve device 147, bore 159, chamber 161 and passage 165. When the fluid pressure in chamber 151 of the cut-off valve device 146 acting on diaphragm 150 increases to a predetermined degree, said diaphragm, together with valves 158 and 163, is actuated to its lowermost position in which valve 158 cuts off communication between application chamber 156 and passage 166 leading to safety control pipe 77, and valve 163 establishes communication between said safety control pipe and the atmosphere by way of passage 175, chamber 161, chamber 162, passage 171 and atmospheric vent port 172. By reason of choke 173 flow of fluid under pressure in passage 171 to chamber 151 in the overspeed suppression valve device 149 is restricted for the purpose of preventing the suppression of a train control, such as an overspeed, application being effected as a result of adverse traffic conditions.

The brake controlling valve device 10 in effecting an emergency application of the brakes also operates to supply fluid under pressure to sanding pipe 176 which leads to chamber 186 in the sanding valve device 6 and also to chamber 151 in the application insuring valve device 147. In response to the pressure thus supplied to chamber 151 in said valve device 147, diaphragm 150 acts through the medium of follower 154 and stem 153 to effect movement of valves 158 and 165 to their lowermost positions, in which valve 158 is seated and valve 163 is unseated. Supply of fluid under pressure from the valve device 10 to chamber 151 in cut-off valve device 146 is thus cut off by valve 158 and fluid under pressure supplied to said chamber flows through passage 165 to chamber 161, and thence past valve 163 to chamber 162 whence it flows to atmosphere by way of passage 171 and vent port 172.

Upon the resulting reduction of fluid pressure in chamber 151 of the cut-off valve device 146 spring 157 actuates follower 154 and thereby valves 158 and 163 in an upward direction to the positions in which they are shown in Fig. 1A of the drawings. In this position application chamber 46 in application valve device 141 will again be connected to safety control pipe 77 and suppression of a safety control application by the cut-off valve device 146 in a manner hereinafter explained is positively prevented by the operation of the application insuring valve device 147 induced by the operation of the brake controlling valve device 10 in effecting an emergency application of the brakes.

*Suppression of a safety control application*

As previously described, a permanent suppression of a safety control application may be obtained by the operation of the cut-off valve device 146. That is, the brake valve handle 26 may be moved to service position, or emergency position, to effect a relatively heavy application of the brakes with respect to a light slack gathering application of the brakes. Upon operation of the brake controlling valve device 10 to supply fluid under pressure to a predetermined degree (such as 30 pounds, for example) to control pipe 178, a branch thereof conducts said fluid under pressure to passage 177 in the interlock valve device 7 leading to chamber 156 in the application insuring valve device 147, whence it flows past valve 158 through bore 159 to chamber 161, and thence to chamber 151 in the cut-off valve device 146. In response to the pressure of fluid to a degree determined by the value of the springs 164 and 157 the diaphragm 150 actuates valves 158 and 163 to their lowermost positions, in which connection between safety control pipe 77 and application chamber 46 in the emergency application valve device 41 is cut off and said safety control pipe is connected to atmosphere by way of passage 175, chamber 161, passage 171 and atmospheric vent port 172.

*Automatic emergency application of brakes in response to unfavorable train control overspeed conditions*

With the brake valve handle 26 of the brake valve device 2 in running position, which is its normal charging and brake release position an automatic emergency application of brakes may be effected in case an unfavorable overspeed condition is encountered which condition will effect deenergization of magnet 216 by means of conduits 216a and 216b leading from an overspeed detector apparatus of the type disclosed in the aforementioned patent issued to E. S. Cook.

Upon deenergization of the magnet 216 spring 218 actuates valve 205 from its extreme lower position, in which the supply of fluid under pressure from main reservoir 20 to chamber 206 is cut off and said chamber is connected to atmosphere, to its extreme upper position in which communication between said chamber and vent port 215 is cut off and said chamber is connected to main reservoir 20. Fluid under pressure supplied from main reservoir 20 to chamber 212 by way of pipe 127 flows through pipe 207 to warning whistle 208 and also gradually to control chamber 151 in the overspeed application valve device 148 by way of chamber 206, pipe 207, choke 210, reservoir 182, pipe 181, and passage 180. After a predetermined period of time as determined by the volume of the reservoir 182 in relation to the flow capacity of choke 210 the pressure of fluid in chamber 151 of overspeed application valve 148 acting on diaphragm 150 will become increased sufficiently to overcome the opposing force of the spring 157 and move the follower 154 and thereby connected valve 158 downwardly into seating engagement with valve member 160, thus closing the connection of passage 171 to atmospheric chamber 161 by way of bore 159. Further downward movement of the diaphragm 150 causes the valve member 160 to move downward, unseating valve 163 and connecting chamber 162 to atmosphere by way of chamber 161 and passage 184a. Fluid under pressure in chamber 46 of the emergency application valve device 41 then flows to atmosphere by way of passage and pipe 47, passage 166 in the interlock valve device 7, past valve 158 of the cut-off valve device 146, which is in the position shown when the brakes are released, through bore 159 in valve member 160 to chamber 161, and thence through passage 175 to chamber 156 in the overspeed suppression valve device 149, whence it flows past valve 158 through bore 159 in valve member 160 to chamber 161 therein. Fluid under pressure thus flowing to chamber 161 in the overspeed suppression valve device 149 then flows through passage 184 to chamber 162 in the overspeed application valve device 148, past the presently unseated valve 163 to chamber 162 and thence to atmosphere by way of passage and port 184a.

If the engineman is on the alert he may prevent operation of the emergency application valve device 41 as a result of an adverse traffic condition, such as the overspeed condition previously mentioned, occurring when the brake valve handle 26 is in the running position by moving said handle to either the first service position, or to service position for effecting a light reduction in brake pipe pressure and then moving said handle to lap position.

Concerning first service position, it will be noted upon referring to Fig. 2 and Fig. 3 that with the rotary valve 128 of the selector valve device 4 in freight position the suppression reservoir 139 is connected to the control chamber 151 of the overspeed suppression valve device 149 by way of pipe and passage 138, cavity 136 in said rotary valve 128 (Fig. 3), passage and pipe 137, cavity 260 in rotary valve 23 (Fig. 2), passage 251 and passage 174. When the pressure of fluid thus supplied to chamber 151 of the overspeed suppression valve device 149 and acting on diaphragm 150 thereof becomes sufficient to overcome the opposing force of the spring 157, said diaphragm and its follower 154, together with its connected valves 158 and 163 is actuated downwardly towards their lowermost positions.

First, valve 158 of valve device 149 is actuated into seating engagement with the upper end of valve member 160 thereby cutting off communication of safety control pipe 77 through bore 159 of said valve member to chamber 161 of the overspeed application valve device 148, which chamber 161 at this time is connected past valve 163 to chamber 161 which leads to atmosphere by way of atmospheric vent passage 184a. Then upon further downward movement of said diaphragm valve 163 is unseated, connecting chamber 162, which leads through passage 171, to atmosphere by the same route.

It will be noted that passage 174 is always open to atmosphere through choke 173 and atmospheric vent port 172. Consequently this suppression lasts only for a limited time determined by the flow capacity of choke 173 relative to the volume of the suppression reservoir.

As previously mentioned, a temporary suppression of a train control overspeed application may be obtained by moving the brake valve handle 26 to service position to effect a small reduction in the equalizing reservoir 62 and then to the lap position. In service position equalizing discharge valve piston chamber 58 and equalizing reservoir 62 are connected to passage 60 by way of passages 59 and 61, respectively, passage 60 being open to atmosphere by way of cavity 265 in rotary valve 23 (Fig. 2) and exhaust port 243. In response to the predominant pressure of fluid in chamber 63 the piston 57 is actuated towards the left hand, thereby rocking the bell crank lever 65 in a counter-clockwise direction and unseating valve 71 as herein before described. When the desired reduction of the pressure of fluid in the equalizing reservoir is obtained, the brake valve handle 26 may be moved to lap position. The equalizing discharge valve 71 remains unseated until the opposing pressures acting on piston 57 are substantially balanced.

It will be noted upon referring to Fig. 2 that in service and lap positions passage 72 is connected through a cavity 267 to passage 174. Consequently fluid under pressure in chamber 63 flows past valve 71, through passage 72, cavity 267 and passage 174 to the control chamber of the overspeed suppression valve device 149. In response to the pressure of fluid thus supplied from the equalizing discharge valve device 42 the valve device 149 operates to effect a temporary suppression in the same manner as described above in connection with supplying fluid under pressure from suppression reservoir 139 in first service position. Now, however, the suppression continues as long as equalizing discharge valve 71 remains unseated with brake valve handle in lap position.

Referring now to the selector valve device 4 in particular for briefly summarizing its operation, it will be noted that as shown in Fig. 3, the rotary valve 128 on said device has 3 positions, namely, "freight," "lap" and "passenger" positions. In both "freight" and "passenger" positions of said rotary valve, chamber 111 in the independent brake valve device 3 is connected through passage and pipe 141, cavity 140 of the rotary valve 128, and passage 141 to the actuating pipe 142 leading to the brake controlling valve device 10, so that a release of the brakes on the locomotive may be obtained in either position of rotary valve 128 while an application of brakes on the train is occurring by depressing handle 85 of said brake valve device. In lap position, however, the actuating pipe 142 is lapped off so that the brake controlling valve device 10 may operate in response to variations in brake pipe pressure initiated in some other parts of the train to effect an applicaction of the brakes on the unit shown without being affected by vertical movement of said handle. It should be noted that pipe and passage 141 is now connected to pipe and passage 131, which, in release position of the handle 85 as shown, is open to atmosphere through chamber 92, past valve 91, chamber 81 and self-lapping valve mechanism 96. Thus, fluid under pressure in chamber 111 is vented to atmosphere through the selector valve device 4 in lap position.

Also, in both "freight" and "passenger" positions chamber 81 in the independent brake valve device 3 is connected past valve 91 through chamber 92, passage and pipe 131, cavity 130 in the rotary valve 128 to the independent application release pipe 132 leading to the brake controlling valve device 10, so that a straight air application or release of the brakes on the locomotive may be made independently of the brakes on the train by horizontal manipulation of the handle 85. In lap position chamber 81 is connected to chamber 111, which is normally open to atmosphere through chamber 109 and port 110 by the cavity 268 as previously noted, and therefore manipulation of the brake valve handle 85 in any manner merely vents air to atmosphere or bottles it and has no effect on the brakes.

In "freight" position pipe and passage 137 leading to the brake valve device 2 is connected through cavity 136 in rotary valve 128 to suppression reservoir 139 through passage and pipe 138. Therefore, a temporary suppression of an overspeed application may be obtained by placing the handle 26 of the brake valve device 2 in first service position as previously described. It will be noted that these passages are lapped off in the other two positions of the rotary valve 128. It will be further noted that in "freight" position, controlled emergency pipe 135 leading to the brake controlling valve device 10 is connected through restricted port 134, chamber 125, passage 126 and pipe 127 to main reservoir 20 for obtaining a delay in an emergency application of the brakes on a long train for the purpose of gathering slack before a heavy application is effected. This operation is available only in "freight" position of the rotary valve 128 since passage 135 is cut off in lap position and connected to atmospheric port 133 in "passenger" position.

Thus it will be seen that when a long train is being braked the split reduction feature and the controlled emergency feature are made available to the operator on the leading unit in a train by placing the selector valve on the leading unit in "freight" position and the selector valve on the trailing unit in the lap position where the controlled emergency pipe is connected through the train. Also, control by the use of the independent brake valve device 3 is placed in the hands of the operator of the leading unit by placing the selector valve rotary valve 128 on the leading unit in either "passenger" or "freight" position and the rotary valve of the selector valve in the trailing unit in lap position. Likewise it will be noted that these special features for a long train are cut out when the rotary valve is placed in passenger position when operating the brakes on a short train.

SUMMARY

It will now be apparent that we have provided an improved locomotive brake equipment embodying automatic train control apparatus controlled by train speed or safety control apparatus which is adapted for use on long or short trains wherein the brakes are adapted to be controlled on the well-known automatic principle. The application valve device 41 provides for an emergency application in the event of failure of the operator to hold either the brake valve handle 26 or foot valve pedal arm 79 depressed, or in the event of an adverse traffic condition such as overspeed in restricted territory. This emergency application may be a straight-away application, or a delayed application as determined by the position of the selector valve rotary valve 128. Also, control of the locomotive brakes by manipulation of the independent brake valve handle 85 may be cut out by the selector valve device 4 when the locomotive is operating as a trailing unit in a train. This equipment also embodies means for suppressing a safety control application or an overspeed application if the engine-man or operator is on the alert and effects an overspeed application of approximately 30 pounds brake cylinder pressure, or in the event of overspeed, for also obtaining temporary suppression by effecting a light application of the brakes.

While only one embodiment of the invention is described in detail it is not the intention to limit the scope to that embodiment or otherwise than by the terms of the appended claims.

Having now described our invention, what we claim as new and desire to secure by Letters Patent is:

1. In a locomotive brake equipment, in combination, a brake pipe, a safety control pipe, an application valve device comprising a piston valve having a normal position in which fluid under pressure is supplied to said safety control pipe at a restricted rate and to said brake pipe and operative upon a reduction in the pressure of fluid in said safety control pipe at a certain rate to another position in which said brake pipe is cut off from the supply of fluid under pressure and vented to atmosphere, a brake cylinder control pipe, brake controlling valve means operative upon a reduction in brake pipe pressure to supply fluid under pressure to said brake cylinder control pipe for effecting an application of the brakes, a safety control device for venting fluid under pressure from said safety control pipe to effect a reduction therein at said certain rate when operating conditions are adverse to safety, a cut-off valve device comprising a control chamber and valve means having a normal position in which said safety control pipe is connected to said safety control device and operable in response to a predetermined degree of fluid pressure supplied to said control chamber from said brake cylinder control pipe to another position in which said safety control pipe is cut off from said safety control device, a sanding pipe, and an application insuring valve device comprising valve means having a normal position in which said brake cylinder control pipe is connected to the control chamber in said cut-off valve device and operable in response to the pressure of fluid in said sanding pipe to a position in which said brake cylinder control pipe is cut off from said control chamber and said control chamber is connected to atmosphere.

2. In a locomotive brake equipment, in combination, a brake pipe, a safety control pipe, an emergency application valve device comprising a piston valve having a normal position in which fluid under pressure is supplied to said safety control pipe at a restricted rate and to said brake pipe and operative upon a reduction in the pressure of fluid in said safety control pipe at a certain rate to another position in which said brake pipe is cut off from the supply of fluid under pressure and vented to atmosphere at an emergency rate of reduction, a sanding pipe, a brake cylinder control pipe, brake controlling valve means operable upon a reduction in brake pipe pressure at an emergency rate to supply fluid under pressure to said sanding pipe to effect sanding of track rails and also to said brake cylinder control pipe for effecting an application of the brakes, a safety control device for venting fluid under pressure from said safety control pipe to effect a reduction therein at said certain rate when operating conditions are adverse to safety, a cut-off valve device comprising a control chamber and valve means having a normal position in which said safety control pipe is connected to said safety control device and operable in response to a predetermined degree of pressure of fluid supplied to said control chamber from said brake cylinder control pipe to another position in which said safety control pipe is cut off from said safety control device, and an application insuring valve device comprising valve means having a normal position in which said brake cylinder control pipe is connected to said control chamber in said cut-off valve device and operable in response to the pressure of fluid in said sanding pipe to a position in which said brake cylinder control pipe is cut off from said control chamber and said control chamber is connected to atmosphere.

3. In a locomotive brake equipment, in combination, a brake pipe, a safety control pipe, an emergency application valve device comprising a piston valve having a normal position in which fluid under pressure is supplied to said safety control pipe at a restricted rate and to said brake pipe and operative upon a reduction in the pressure of fluid in said safety control pipe at a certain rate to another position in which said brake pipe is cut off from the supply of fluid under pressure and vented to atmosphere at an emergency rate of reduction, a sanding control pipe, a brake cylinder control pipe, brake controlling valve means operable upon a reduction in brake pipe pressure at an emergency rate to supply fluid under pressure to said sanding control pipe and to said brake cylinder control pipe for effecting an application of the brakes, a safety control device for venting fluid under pressure from said safety control pipe to effect a reduction therein at said certain rate when operating conditions are adverse to safety, suppression means operable in response to a predetermined degree of fluid pressure in said brake cylinder control pipe to cut off communication between said safety control device and said safety control pipe, and application insuring valve means operable in response to pressure of fluid in said sanding control pipe to cut off communication between said brake cylinder control pipe and said suppression means.

4. In a locomotive brake equipment, in combination, a brake pipe, a safety control pipe, an application valve device operative upon a reduction in pressure of fluid in said safety control pipe to effect a reduction in pressure of fluid in said brake pipe, a brake cylinder control pipe, a sanding control pipe, brake controlling valve means operative upon a reduction in brake pipe pressure at a service rate to supply fluid under pressure to said brake cylinder control pipe, and operative upon a reduction in brake pipe pressure at an emergency rate to supply fluid under pressure to said sanding control pipe, a safety control device having a normal position in which communication of said safety control pipe to atmosphere is closed and movable to a safety control position in which said safety control pipe is vented to atmosphere, a cut-off valve device having a normal position in which said application valve device is connected to said safety control pipe and movable in response to pressure of fluid in said brake cylinder control pipe to a position in which communication between said safety control pipe and said application valve device is closed and said safety control pipe is open to atmosphere, and an application insuring valve device normally establishing communication between said brake cylinder control pipe and said cut-off valve device and movable in response to pressure of fluid in said sanding control pipe to a position in which said brake cylinder control pipe is cut off from said cut-off valve device and said cut-off valve device is opened to atmosphere.

5. In a locomotive brake equipment, in combination, a brake pipe, a safety control pipe, an emergency application valve device operative upon a reduction in the pressure of fluid in said safety control pipe to effect a reduction in the pressure of fluid in said brake pipe, a brake cylinder control pipe, a sanding control pipe, brake controlling valve means operative in response to a reduction in the fluid pressure in said brake pipe at an emergency rate to supply fluid under pressure to said brake cylinder control pipe and to said sanding control pipe, a safety control device having a normal non-venting position and movable upon the occurrence of an adverse safety condition to a position in which said safety control pipe is vented to atmosphere, a cut-off valve device having a position in which said safety control pipe is in communication with said application valve device and movable in response to pressure of fluid in said brake cylinder control pipe to a position in which said communication is cut off, and valve means normally establishing communication between said brake cylinder control pipe and said cut-off valve device and movable in response to the pressure of fluid in said sanding control pipe to a position in which said brake cylinder control pipe is cut off from said cut-off valve device and said cut-off valve device is vented to atmosphere.

6. In a brake equipment, in combination, a brake pipe, a sanding valve device, brake controlling valve means operative upon a reduction in brake pipe pressure at an emergency rate to supply fluid under pressure for effecting an emergency application of the brakes and also to independently supply fluid under pressure for operating said sanding valve device to supply fluid under pressure for effecting sanding of the track wheels, an application valve device operable upon venting of fluid under pressure from a chamber for effecting an emergency application of the brakes, fluid pressure responsive means for venting fluid under pressure from said chamber, and means controlled by speed conditions and operable upon an unfavorable change therein to supply fluid under pressure to said fluid pressure responsive means.

7. In a fluid pressure brake for a locomotive, in combination, a brake pipe, a brake valve device operable manually to a position to effect a reduction in brake pipe pressure to effect an application of the brakes, valve means operative to effect an emergency application of the brakes independently of said brake valve device, means controlled by speed of said locomotive and operable upon an adverse change in said speed to effect the operation of said valve means, suppression means for rendering said valve means non-responsive to a change in locomotive speed, a reservoir charged with fluid under pressure, and means operable with said brake valve device in said position to connect said reservoir to said suppression means for actuating said suppression means.

8. In a locomotive brake equipment, in combination, a brake pipe, an equalizing reservoir, a discharge valve mechanism operative upon a reduction in equalizing reservoir pressure to discharge fluid under pressure from said brake pipe to effect an application of the brakes, brake application valve means capable of responding to an overspeed condition to effect an application of the brakes, suppression means operative in response to fluid pressure to render said brake application valve means non-responsive to an overspeed condition, a suppression reservoir, and a brake valve device having a first service position for discharging fluid under pressure from said equalizing reservoir at a controlled rate and for connecting said suppression reservoir and the resulting discharge of fluid under pressure from said brake pipe to said suppression means.

9. In a locomotive brake equipment, in combination, a brake pipe, an equalizing reservoir, a discharge valve mechanism operative upon a reduction in equalizing reservoir pressure to discharge fluid under pressure from said brake pipe, brake controlling valve means operative in response to a reduction in brake pipe pressure to effect an application of the brakes, brake application means capable of responding to an overspeed condition to effect a reduction in brake pipe pressure, suppression means operative in response to fluid pressure to render said brake application valve means non-responsive to an overspeed condition, a suppression reservoir, a brake valve device having a first service position for discharging fluid under pressure from said equalizing reservoir at a controlled rate and for connecting said suppression reservoir and said discharge of fluid under pressure from said brake pipe to said suppression means, and flow restricting means for venting fluid under pressure from said suppression means to atmosphere.

10. In a locomotive brake equipment, in combination, a brake pipe, an equalizing reservoir, a discharge valve mechanism operative upon a reduction in equalizing reservoir pressure to discharge fluid under pressure from said brake pipe, brake controlling valve means operative in response to a reduction in brake pipe pressure to effect an application of the brakes, brake application means capable of responding to an adverse traffic condition to effect a reduction in brake pipe pressure, suppression means operative in response to fluid pressure to render said brake application valve means non-responsive to an adverse traffic condition, a suppression reservoir, a brake valve device having a first service position for discharging fluid under pressure from said equalizing reservoir at a controlled rate and for connecting said suppression reservoir and said discharge of fluid under pressure from said brake pipe to said suppression means, and flow restricting means for venting fluid under pressure from said suppression means to atmosphere.

11. In a locomotive brake equipment, in combination, a brake pipe, an equalizing reservoir, a discharge valve mechanism operative upon a reduction in equalizing reservoir pressure to discharge fluid under pressure from said brake pipe, brake application valve means capable of responding to an overspeed condition to effect an application of the brakes, suppression means operative in response to fluid pressure to render said brake application valve means non-responsive to an overspeed condition, and a brake valve device having a position for effecting a reduction in equalizing reservoir pressure and to connect the resulting discharge of fluid under pressure from said discharge valve mechanism to said suppression means.

12. In a locomotive brake equipment, in combination, a brake pipe, an equalizing reservoir, a discharge valve mechanism operative upon a reduction in equalizing reservoir pressure to discharge fluid under pressure from said brake pipe, brake application valve means capable of responding to an overspeed condition to effect an application of the brakes, suppression means operative in response to fluid pressure to render said brake application valve means non-responsive to an overspeed condition, a brake valve device having a position for effecting a reduction in equalizing reservoir pressure and to connect the resulting discharge of fluid under pressure from said discharge valve mechanism to said suppression means, and flow restricting means for venting fluid under pressure from said suppression means to atmosphere.

13. In a locomotive brake equipment, in combination, a brake pipe, an equalizing reservoir, a discharge valve mechanism operative upon a reduction in equalizing reservoir pressure to effect a discharge of fluid under pressure from said brake pipe, brake controlling valve means operative in response to a reduction in brake pipe pressure to effect an application of the brakes, brake application valve means capable of responding to an adverse traffic condition to effect a reduction in brake pipe pressure, suppression means operative in response to fluid pressure to render said brake application valve means non-responsive to said adverse traffic condition, and a brake valve device having a position for effecting a reduction in equalizing reservoir pressure and connecting the resulting discharge of fluid under pressure from said brake pipe to said suppression means.

14. In a locomotive brake equipment, in combination, a brake pipe, an equalizing reservoir, a discharge valve mechanism operative upon a reduction in equalizing reservoir pressure to effect a discharge of fluid under pressure from said brake pipe, brake controlling valve means operative in response to a reduction in brake pipe pressure to effect an application of the brakes, brake application valve means capable of responding to an adverse traffic condition to effect a reduction in brake pipe pressure, suppression means operative in response to fluid pressure to render said brake application valve means non-responsive to an adverse traffic condition, a brake valve device having a position for effecting a reduction in equalizing reservoir pressure and connecting discharge of fluid under pressure caused thereby from said brake pipe to said suppression means, and flow restricting means for venting fluid under pressure from said suppression means to atmosphere, thereby timing the duration of the suppression.

15. In a locomotive brake equipment, in combination, a brake pipe, an equalizing reservoir, a discharge valve mechanism operative upon a reduction in equalizing reservoir pressure to discharge fluid under pressure from said brake pipe, brake application valve means capable of responding to an overspeed condition to effect an application of the brakes, suppression means operative in response to fluid pressure to render said brake application valve means non-responsive to an overspeed condition, and a brake valve device having a service position for effecting a reduction in equalizing reservoir pressure and to connect fluid under pressure caused to be discharged thereby from said discharge valve mechanism to said suppression means, said brake valve device being movable thereafter to a lap position for bottling the fluid pressure in said equalizing reservoir and to maintain the aforesaid fluid pressure discharge connection.

16. In a locomotive brake equipment, in combination, a brake pipe, an equalizing reservoir, a discharge valve mechanism operative upon a reduction in equalizing reservoir pressure to discharge fluid under pressure from said brake pipe, brake application valve means capable of responding to an overspeed condition to effect an application of the brakes, suppression means operative in response to fluid pressure to render said brake application valve means non-responsive to an overspeed condition, a brake valve device having a service position for effecting a reduction in equalizing reservoir pressure and to connect fluid under pressure caused to be discharged thereby from said discharge valve mechanism to said suppression means, said brake valve device being movable thereafter to a lap position for bottling fluid pressure in said equalizing reservoir and for maintaining the aforesaid fluid pressure discharge connection, and flow restricting means for venting fluid under pressure from said suppression means to atmosphere.

17. In a locomotive brake equipment, in combination, a brake pipe, an equalizing reservoir, a discharge valve mechanism operative upon a reduction in equalizing reservoir pressure to effect a discharge of fluid under pressure from said brake pipe to a like degree, brake controlling valve means operative upon a reduction in brake pipe pressure to effect an application of brakes, brake application valve means capable of responding to an overspeed condition to effect a reduction in brake pipe pressure, suppression means operable in response to fluid pressure to render said brake application valve means non-responsive to an overspeed condition, and a brake valve device having a service position for effecting a reduction of equalizing reservoir pressure and for connecting discharge of fluid under pressure from said brake pipe caused thereby to said suppression means, said brake valve device being movable thereafter to a lap position for bottling the fluid pressure in said equalizing reservoir and continuing the aforesaid fluid pressure discharge connection.

18. In a locomotive brake equipment, in combination, a brake pipe, an equalizing reservoir, a discharge valve mechanism operative upon a reduction in equalizing reservoir pressure to effect a discharge of fluid under pressure from said brake pipe to a like degree, brake controlling valve means operative upon a reduction in brake pipe pressure to effect an application of the brakes, brake application valve means capable of responding to an overspeed condition to effect a reduction in brake pipe pressure, suppression means operative in response to fluid pressure to render said brake application valve means non-responsive to said overspeed condition, a brake valve device having a service position for effecting a reduction in equalizing reservoir pressure and for connecting discharge of fluid under pressure from said brake pipe caused thereby to said suppression means, said brake valve device being movable thereafter to a lap position for bottling the fluid pressure in said equalizing reservoir and continuing the aforesaid fluid pressure discharge connection, and flow restricting means for venting fluid under pressure acting on said suppression means to atmosphere.

19. In a locomotive brake equipment, in combination, a brake pipe, an equalizing reservoir, a discharge valve mechanism operative upon a reduction in equalizing reservoir pressure to effect a discharge of fluid under pressure from said brake pipe, brake application valve means capable of responding to an overspeed condition to effect an application of the brakes, suppression means operative in response to fluid pressure to render said brake application valve means non-responsive to an overspeed condition, and a brake valve device having a first service position for discharging fluid under pressure from said equalizing reservoir at a controlled rate and for connecting the resulting discharge of fluid under pressure from said brake pipe together with said suppression reservoir to said suppression means and movable therefrom to another service position to effect a further reduction in equalizing reservoir pressure at a certain faster rate than said controlled rate and to connect only said discharge of fluid under pressure from said brake pipe to said suppression means.

20. In a locomotive brake equipment, in combination, a brake pipe, an equalizing reservoir, a discharge valve mechanism operative upon a reduction in equalizing reservoir pressure to effect a discharge of fluid under pressure from said brake pipe, brake controlling valve means operative upon a reduction in brake pipe pressure to effect an application of the brakes, brake application valve means capable of responding to an overspeed condition to effect a reduction in brake pipe pressure, suppression means operative in response to fluid pressure to render said brake application valve means non-responsive to an overspeed condition, and a brake valve device having a first service position for discharging fluid under pressure from said equalizing reservoir at a controlled rate and for connecting the resulting discharge of fluid under pressure from said brake pipe together with said suppression reservoir to said suppression means, and movable therefrom to another service position to effect a further reduction in equalizing reservoir pressure at a certain faster rate than said controlled rate and to connect only said discharge of fluid under pressure from said brake pipe to said suppression means, and flow restricting means for venting fluid under pressure from said suppression means to atmosphere.

21. In a locomotive brake equipment, in combination, a brake pipe, an equalizing reservoir, brake controlling valve means operative upon a reduction in brake pipe pressure to effect an application of the brakes, a discharge valve mechanism operative upon a reduction in equalizing reservoir pressure to discharge fluid under pressure from said brake pipe, brake application valve means capable of responding to an overspeed condition to effect a reduction in brake pipe pressure, suppression means operative in response to fluid pressure to render said brake application valve means non-responsive to an overspeed condition, a suppression reservoir, and a brake valve device having a first service position for discharging fluid under pressure from said equalizing reservoir at a controlled rate and connecting said suppression reservoir and the resulting discharge of fluid under pressure from said brake pipe to said suppression means, said brake valve device being movable to another service position to effect a further reduction in equalizing reservoir pressure at a certain faster rate than said controlled rate and to connect only fluid under pressure discharged from said discharge valve mechanism to said suppression means, and said brake valve device being also movable to a lap position for bottling fluid under pressure in said equalizing reservoir and connecting continued discharge of fluid under pressure from said discharge valve mechanism to said suppression means.

22. In a locomotive brake equipment, in combination, a brake pipe, an equalizing reservoir, a discharge valve mechanism operative upon a reduction in equalizing reservoir pressure to discharge fluid under pressure from said brake pipe, brake application valve means capable of responding to an overspeed condition to effect an application of the brakes, suppression means operative in response to fluid under pressure to render said brake application valve means non-responsive to an overspeed condition, a suppression reservoir, a brake valve device having a first service position for discharging fluid under pressure from said equalizing reservoir at a controlled rate and connecting said suppression reservoir and the resulting discharge of fluid under pressure from said brake pipe to said suppression means, said brake valve device being movable to another service position to effect a further reduction in equalizing reservoir pressure at a certain faster rate than said controlled rate and to connect only fluid under pressure discharged from said discharge valve mechanism to said suppression means, and said brake valve device being also movable to a lap position for bottling fluid under pressure in said equalizing reservoir and connecting the continued discharge of fluid under pressure from said discharge valve mechanism to said suppression means, and flow restricting means for venting the fluid under pressure supplied to said suppression means to atmosphere.

23. In a locomotive brake equipment, in combination, a brake pipe, an equalizing reservoir, a discharge valve mechanism operative upon a reduction in equalizing reservoir pressure to discharge fluid under pressure from said brake pipe, brake controlling valve means operative in response to a reduction in brake pipe pressure to supply fluid under pressure to a brake cylinder control pipe for effecting an application of the brakes, brake application valve means capable of responding to an overspeed condition to effect a reduction in brake pipe pressure, a first suppression means operative in response to fluid pressure to render said brake application valve means non-responsive to an overspeed condition, a brake valve device having a service position for effecting a reduction in equalizing reservoir pressure and to connect fluid under pressure consequently discharged from said discharge valve mechanism to said first suppression means, means for venting the fluid under pressure thus supplied to said suppression mean at a slow rate relative to said supply rate, and a second suppression means operative in response to pressure of fluid in said brake cylinder control pipe above a chosen degree to continue the non-responsiveness of said brake application valve means to an overspeed condition.

24. In a locomotive brake equipment, in combination, a brake pipe, an equalizing reservoir, a discharge valve mechanism operative upon a reduction in equalizing reservoir pressure to effect a discharge of fluid under pressure from said brake pipe, brake application valve means capable of responding to an overspeed condition to effect an application of the brakes, suppression means operative in response to fluid pressure to render said brake application valve means non-responsive to an overspeed condition, a suppression reservoir, and a brake valve device having a first service position for discharging fluid under pressure from said equalizing reservoir at a controlled rate and for connecting said suppression reservoir to said suppression means and movable therefrom to another service position to effect a further reduction in equalizing reservoir pressure at a certain faster rate than said controlled rate and to connect only the fluid under pressure discharged from said discharge valve mechanism to said suppression means.

25. In the locomotive fluid pressure brake equipment, in combination, a handle movable in both a vertical plane and a horizontal plane, valve means controlled by movement of said handle in said vertical plane for controlling a communication through which fluid under pressure is supplied and released in controlling external brake control means and self-lapping valve means controllable by movement of said handle in a portion of said horizontal plane for controlling another communication through which said self-lapping valve device is effective in controlling the degree of application of the brakes, and external selector valve means for controlling said communications, said selector valve means having one position in which said communications are established and movable to another position in which said communications are cut off and the effectiveness of both of said valve means is nullified.

26. In a locomotive fluid pressure brake equipment, in combination, a brake pipe, a brake controlling valve means operative upon a reduction in brake pipe pressure at a service rate to effect an application of the brakes at a service rate and operative upon a reduction in brake pipe pressure at an emergency rate to effect an emergency application of the brakes at an emergency rate, said brake controlling valve means comprising delay valve means normally permitting a straight away emergency rate of application of the brakes, and operable in response to fluid pressure to delay the emergency rate of emergency application for a chosen period of time, selector valve means having one position in which said delay valve means is supplied with fluid under pressure and operable to another position in which said delay valve means is vented to the atmosphere, and an independent brake valve device having a position in which said delay valve means is vented to atmosphere regardless of the position of said selector valve means.

27. In a locomotive fluid pressure brake equipment, in combination, a brake pipe, a brake controlling valve means operative upon a reduction in brake pipe pressure at a service rate to effect an application of the brakes at a service rate and operative upon a reduction in brake pipe pressure at an emergency rate to effect an emergency application of the brakes at an emergency rate, said brake controlling valve means comprising delay valve means normally permitting a straight away emergency rate of application of the brakes, and operable in response to fluid pressure to delay the emergency rate of emergency application for a chosen period of time, and selector valve means having one position in which said delay valve means is supplied with fluid under pressure and operable to another position in which said delay valve means is vented to the atmosphere.

28. In a locomotive fluid pressure brake equipment, in combination, a brake pipe, brake cylinder means operative by fluid pressure to effect an application of the brakes, brake controlling valve means operative upon either a service or emergency rate of reduction in brake pipe pressure to supply fluid under pressure to said brake cylinder means at a corresponding rate, said brake controlling valve means comprising delay means operative by fluid under pressure to restrict the flow of fluid under pressure to said brake cylinder means, selector valve means having one position in which said delay means is supplied with fluid under pressure and operable to another position in which said delay means is vented to atmosphere, and an independent brake valve device having a position in which said delay means is vented to atmosphere independently of said selector valve means.

29. In a locomotive fluid pressure brake equipment, in combination, a brake pipe, a brake controlling valve means operative in response to a reduction in pressure of fluid in said brake pipe to supply fluid under pressure to effect an application of the brakes, brake application valve means operative in response to a reduction in the pressure of fluid in a chamber to effect a reduction in brake pipe pressure, protection valve means operative in response to an adverse operating condition to effect a reduction in pressure of fluid in said chamber, temporary suppression means serially connected with said protection valve means operative in response to fluid pressure to cut off communication of said chamber with said protection valve means, permanent suppression means serially connected with said temporary suppression means and said protection valve means and operative in response to pressure of fluid supplied by said brake controlling valve means to cut off communication of said temporary suppression means and said protection valve means with said chamber, and valve means having a position in which it is operative to effect a reduction in brake pipe pressure and to supply fluid under pressure to said temporary suppression means.

30. In a locomotive fluid pressure brake equipment, in combination, a brake pipe, a brake controlling valve means operative in response to a reduction in the pressure of fluid in said brake pipe to supply fluid under pressure to effect an application of the brakes, brake application valve means operative in response to a reduction in pressure of fluid in a chamber to effect a reduction in brake pipe pressure, protection valve means operative in response to an adverse traffic condition to effect a reduction in pressure of fluid in said chamber, one suppression means operative in response to fluid pressure supplied by said brake controlling valve means to render said protection valve means temporarily non-responsive to said adverse traffic condition, another suppression means interposed between said one suppression means and said chamber and operative in response to pressure of fluid supplied by said brake controlling means to render said protection valve means permanently non-responsive to an adverse traffic condition, and a brake valve device having a position in which it is operative to effect a reduction in brake pipe pressure and to supply fluid under pressure to said temporary suppression means.

31. In a locomotive fluid pressure brake equipment, in combination, a brake pipe, a brake cylinder control pipe, a sanding control pipe, a brake controlling valve means operative in response to a service rate of reduction in brake pipe pressure to supply fluid under pressure to said brake cylinder control pipe only and operative in response to an emergency rate of reduction in brake pipe pressure to supply fluid under pressure to both said brake cylinder control pipe and said sanding control pipe, brake application valve means operative in response to a reduction in pressure of fluid in a chamber to effect an emergency rate of reduction in brake pipe pressure, protection valve means operative in response to an adverse operating condition to effect a reduction in pressure of fluid in said chamber, suppression means operative in response to a predetermined degree of fluid pressure supplied to said brake cylinder control pipe by said controlling valve means to render said protection valve means non-responsive to said adverse operating condition, and application insuring valve means interposed between said brake controlling valve means and said suppression means operative in response to lesser degree of fluid pressure than said predetermined degree to cut off communication between said brake controlling valve means and said suppression means.

32. In a locomotive fluid pressure brake equipment, in combination, a brake pipe, a brake cylinder pipe, a sanding pipe, a brake controlling valve means having one communication with said brake cylinder pipe and another communication with said sanding pipe, said means being operative in response to a service rate of reduction in brake pipe pressure to supply fluid under pressure to said one communication and operative in response to an emergency rate of reduction in brake pipe pressure to supply fluid under pressure to both communications, brake application valve means operative in response to a reduction in the pressure of fluid in a chamber to effect an emergency rate of reduction in brake pipe pressure, protection valve means operative in response to an adverse operating condition to effect a reduction in the pressure of fluid in said chamber, suppression means operative in response to a predetermined degree of fluid pressure in said one communication to render said protection valve means non-responsive to said adverse operating condition, and application insuring valve means interposed in said one communication operative in response to fluid pressure of lesser degree than said predetermined degree to cut off said one communication.

GLENN T. McCLURE.
ERIK G. ERSON.

REFERENCES CITED

The following references are of record in the file of this patent:

UNITED STATES PATENTS

| Number | Name | Date |
| --- | --- | --- |
| 2,112,421 | Masterman | Mar. 29, 1938 |
| 2,256,404 | McNeal | Sept. 16, 1941 |